E. SALZER.
CIGAR CUTTER AND MATCH DELIVERER.
APPLICATION FILED NOV. 26, 1906.

902,170.

Patented Oct. 27, 1908.

2 SHEETS—SHEET 1.

Witnesses
F. L. Ormand
L. E. Barkley

Inventor
By Edward Salzer,
Francis Applerman,
Attorney.

E. SALZER.
CIGAR CUTTER AND MATCH DELIVERER.
APPLICATION FILED NOV. 26, 1906.
902,170.
Patented Oct. 27, 1908.
2 SHEETS—SHEET 2.
Fig. 3.
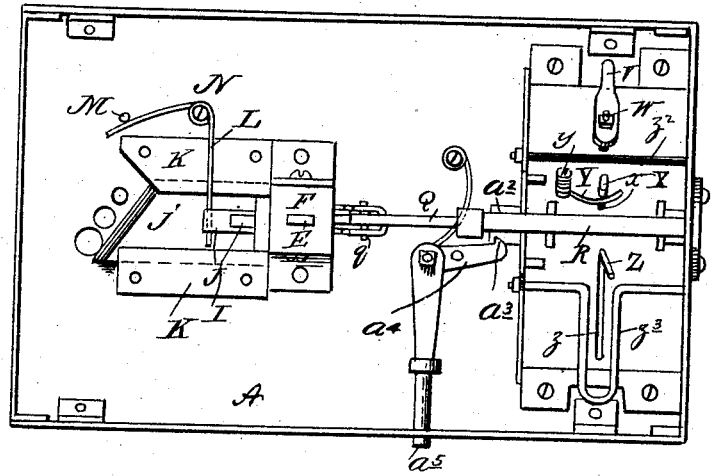
Fig. 5.
Fig. 4.
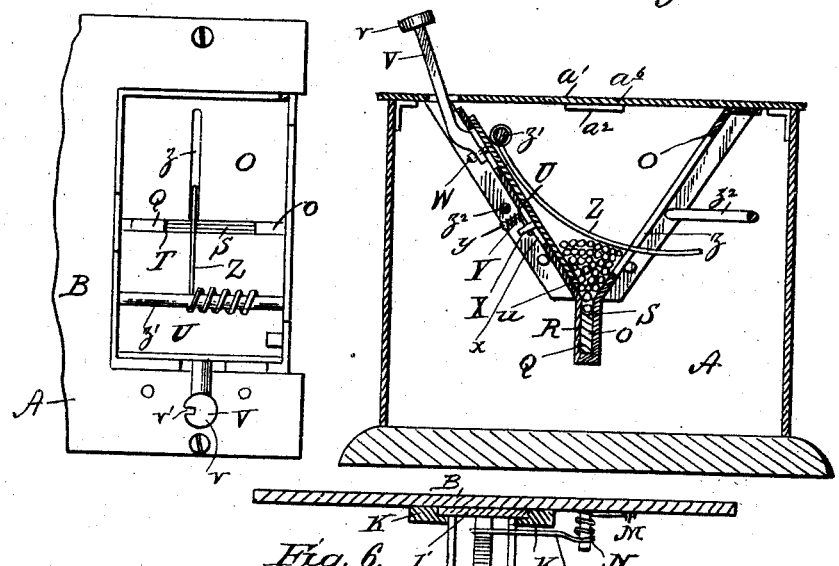
Fig. 6.
Witnesses
F. L. Ousrand
L. E. Barkley
Inventor
Edward Salzer.
By Frank S. Ackerman,
Attorney.

UNITED STATES PATENT OFFICE.

EDUARD SALZER, OF LAPORTE, INDIANA.

CIGAR-CUTTER AND MATCH-DELIVERER.

No. 902,170.　　　　　Specification of Letters Patent.　　　　Patented Oct. 27, 1908.

Application filed November 26, 1906. Serial No. 345,261.

*To all whom it may concern:*

Be it known that I, EDUARD SALZER, citizen of the United States of America, residing at Laporte, in the county of Laporte and State of Indiana, have invented certain new and useful Improvements in Cigar-Cutters and Match-Deliverers, of which the following is a specification.

This invention relates to devices for clipping the ends of cigars and for simultaneously delivering a single match by projecting it from the casing where it can be removed by the hand of the operator.

An object of this invention is to produce a cigar cutter having a casing with a series of graduated openings into which the cigar may be inserted a greater or less extent in order that the size of the cut may be made to suit the user; a knife being provided which is made to reciprocate with relation to the casing through suitable novel mechanism to be hereinafter described; and it is a further object of this invention to provide novel means, operated simultaneously with the knife, for delivering a match as heretofore indicated.

A further object of this invention is to provide a cigar cutter and match delivery device which will possess advantages and points of efficiency and durability proving at the same time comparatively inexpensive to manufacture.

With the foregoing and other objects in view, the invention consists in the details of construction and in the arrangement and combination of parts to be hereinafter more fully set forth and claimed.

In describing the invention in detail, reference will be had to the accompanying drawings, forming part of this specification wherein like characters denote corresponding parts in the several views, in which—

Figure 1:
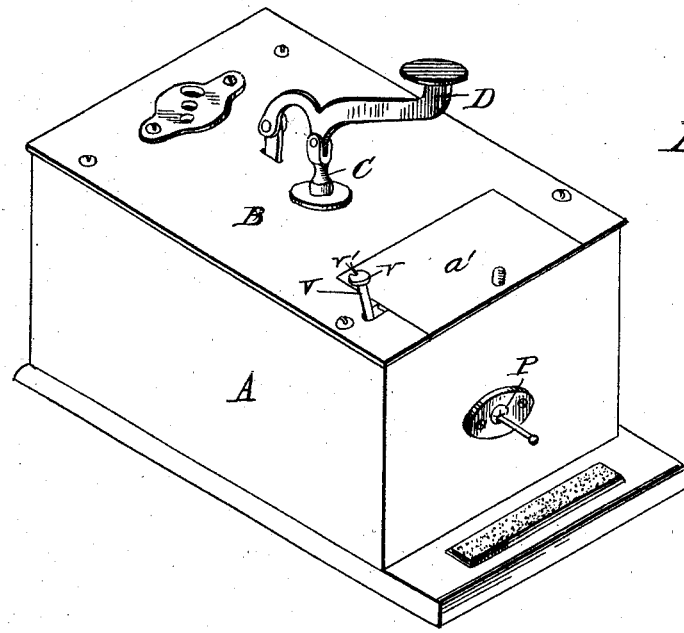
Figure 2:
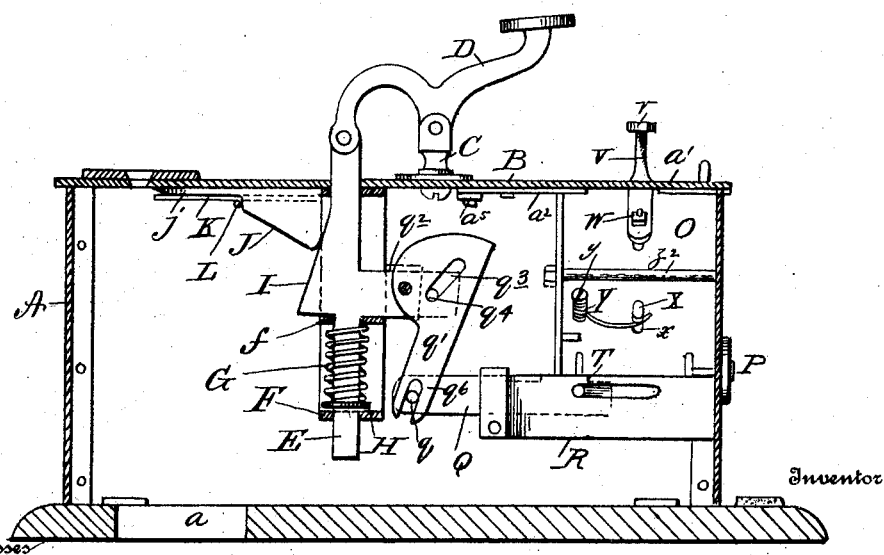

Figure 1, is a perspective view of a casing with parts of operating mechanism exposed.
Fig. 2, is a vertical longitudinal sectional view taken approximately centrally of the casing with the operating parts elevated. Fig. 3, is an underneath plan view with the bottom removed. Fig. 4, is a transverse sectional view through the match delivering mechanism. Fig. 5, is a plan view of the match receptacle. Fig. 6, is a detailed view of the operating lever with a knife in section.

In the drawings A, denotes the casing having a suitable top B, containing a bifurcated post C, in which an operating lever D, is pivoted, the said lever having a goose neck, to which the upper end of the operating rod E, is pivoted. The rod is slidable in a suitable guide F, and the said guide is provided with a web *f*, against which a spring G, bears; the lower end of the said spring being in engagement with a plate H, attached to the bar E. Through the medium of the spring G, the bar is held normally depressed and the pressure of the spring is overcome only by pressure on the outer end of the lever D, which action results in elevating the bar.

The bar is provided with a cam I, which rides over a fin J, attached to or formed with the knife *j*, the said knife being slidable in contact with the undersurface of the top of the casing in such relation to the apertures of the casing as to permit the cutting edge of the knife to pass over the said openings in order that any cigars inserted in the opening will have their ends severed.

The knife is mounted to slide between suitable guides K, riveted or otherwise secured to the inner surface of the top of the casing and the said knife is held normally retracted through the medium of the spring L, which has one leg in engagement with the fin of the knife and the other in engagement with the stud M, projecting from the top, the said spring being coiled approximately centrally around the stud N, which also depends from the inner surface of the top. In operating the cigar cutter, reciprocation of the bar carrying the cam results in the cam riding over the end of the fin and projecting the said fin and blade toward the openings of the casing and, as the bar is depressed through the agency of the spring G, the action of the cam is removed from the fin and the spring L, exerts pressure on the opposite end of the fin to retract the knife and hold the inner end of the fin in engagement with the cam until the operation is repeated.

The match delivery mechanism comprises in its construction a hopper O, which is suspended inside of the casing and is preferably V-shaped in cross section, the side walls of the hopper terminating in such relation as to form a space between them through which the matches pass.

The bottom of the hopper is provided with a support *o*, which holds one end of the match, and said support is preferably concaved and in alinement with an opening P, in the front wall of the casing. The plunger Q, operates in a suitable housing R, and has its upper surface concaved as indicated at S, and cut away from the shoulder T which abuts a match deposited on it. The concaved surface S, is on the same plane as the support $o$, and hence the matches successively rest on the support $o$, and on the concaved surface of the plunger. As the plunger is projected (through mechanism to be hereinafter described) the shoulder T, contacts with the end of the match and as the said plunger moves the match is carried out through the opening P, in the casing, and hence with each projection of the plunger, a match is delivered and as the plunger moves in unison with the cigar cutting device, it follows that as each cigar is trimmed, a match for lighting the said cigar is delivered.

An agitator is applied to the hopper and consists of a sliding plate U, with a beveled edge $u$, which is for the purpose of engaging a match and forcing it on the seat viz: in engagement with the support and with the recessed surface of the plunger. The agitator is operated through the medium of a handle V, which is attached to the said agitator and extends through a hole at the top of the casing, it being provided with a thumb button $v$, which thumb button is provided with a notch $v'$, for a purpose to be presently explained.

The handle V, is attached to the plate U, by the bolt W, which bolt is slidable in a slot formed in the wall of the hopper and the said plate is further provided with a stud X, projecting through a slot $x$, in the wall of the hopper and the said stud is engaged by a spring Y, exerting pressure to hold the plate normally elevated. After the plate has been depressed by pressure on the thumb button and the said thumb button is released, the spring Y, will elevate the plate to permit the repetition of the operation. The spring Y, is anchored to the wall of the hopper by being coiled around a screw $y$, threaded into the wall of the hopper.

As a means for causing the matches to be pressed downward toward the discharge opening, a spring Z, is provided which has its end projecting through a slot $z$, in the wall of the hopper, while the opposite end of the spring is anchored to a rod $z'$ extending longitudinally of the hopper.

The rear wall of the hopper is secured to the casing by means of the bolt $z^2$, and in order to accommodate the spring Z, and permit its movement at the slot $z$, one of the bolts $z^2$, is looped centrally as at $z^3$, in order to permit the spring to move through the loop. While the hopper is being filled the spring Z, may be lifted and inserted in the notch $v'$ where it will be held while the hopper is being filled and when released, the said spring will automatically contact with the top of the pile of matches and the end of the said spring will extend through the slot $z$, and will follow the matches as they pass down the hopper.

The plunger Q, is provided with a cross pin $q$, which works between the forks of a lever $q'$, which lever is pivoted to the arm $q^2$ attached to the guide by the bar E. The lever is provided with a cam slot $q^3$, in which a pin $q^4$ is operated, the pivot of the lever being inside of the cam slot so that upward movement of the pin $q^4$, will tend to swing the lower end of the lever toward the match receptacle and thus project the plunger so as to deliver the matches in the manner heretofore described. The pin $q^4$, is mounted on an arm $q^5$, of the bar E, and hence moves as the bar reciprocates. With each movement therefore, in operating the cutter, the match delivery mechanism is moved.

The lever $q'$ carries a small arm $q^6$, which has its end formed to correspond with the end of the lever and the relation of the arm and lever are such that the end of the plunger Q, lies between them while the pin $q$, of the plunger lies in the bifurcations of the arm and the lever. This construction prevents any binding of the plunger and insures a smooth operation.

The hopper is suspended or attached to the casing in any suitable manner and a suitable base is provided for the casing which is removably secured thereto, the said base having an aperture $a$, for the discharge of the cuttings.

The hopper is provided with a cover $a'$ which is slidable thereon, and said cover has a lug $a^2$, having a notch $a^3$, which is engaged by a dog $a^4$; said dog being spring held in engagement with the lug and being operated by the push rod $a^5$, to cause the dog to disengage the lug for the purpose of permitting the removal of the cover. The dog is slidable through the aperture $a^6$, in the rear wall of the hopper.

Having thus fully described my invention what I claim as new and desire to secure by Letters Patent, is—

1. A device of the character described comprising a resiliently mounted or cushioned rod-member, means for manually operating the same, a plunger adapted to engage and deliver a match, means for feeding matches to said plunger, said rod member having a fixed arm, a lever having an inclined slot receiving a lateral pin from said arm about in horizontal alinement with the fulcrum of said lever, said lever occupying an initially inclined position of approximate obliquity with that of said slot, and having pin and slot connections with said plunger, resiliently pressed means for severing or clipping the tip end of a cigar, said rod member having a cam formation thereon, adapted for engagement with said severing means.

2. A match holder and deliverer, a hopper having two approximately V-shape walls, one of which has a slot, an agitator slidable on the said slotted wall and having an element projecting through the slot, a cover for the hopper having an opening therein, a handle movable through the opening and attached to the element of the agitator whereby movement of the handle is communicated to the agitator.

In testimony whereof I affix my signature in the presence of two witnesses this 23rd day of November 1906.

EDUARD SALZER.

Witnesses:
    A. S. WASSER,
    GERTRUDE ALSFASSER.